April 17, 1956     G. D. PARKER     2,741,948
BICYCLE FLASHING REFLECTOR
Filed May 21, 1952     2 Sheets-Sheet 1
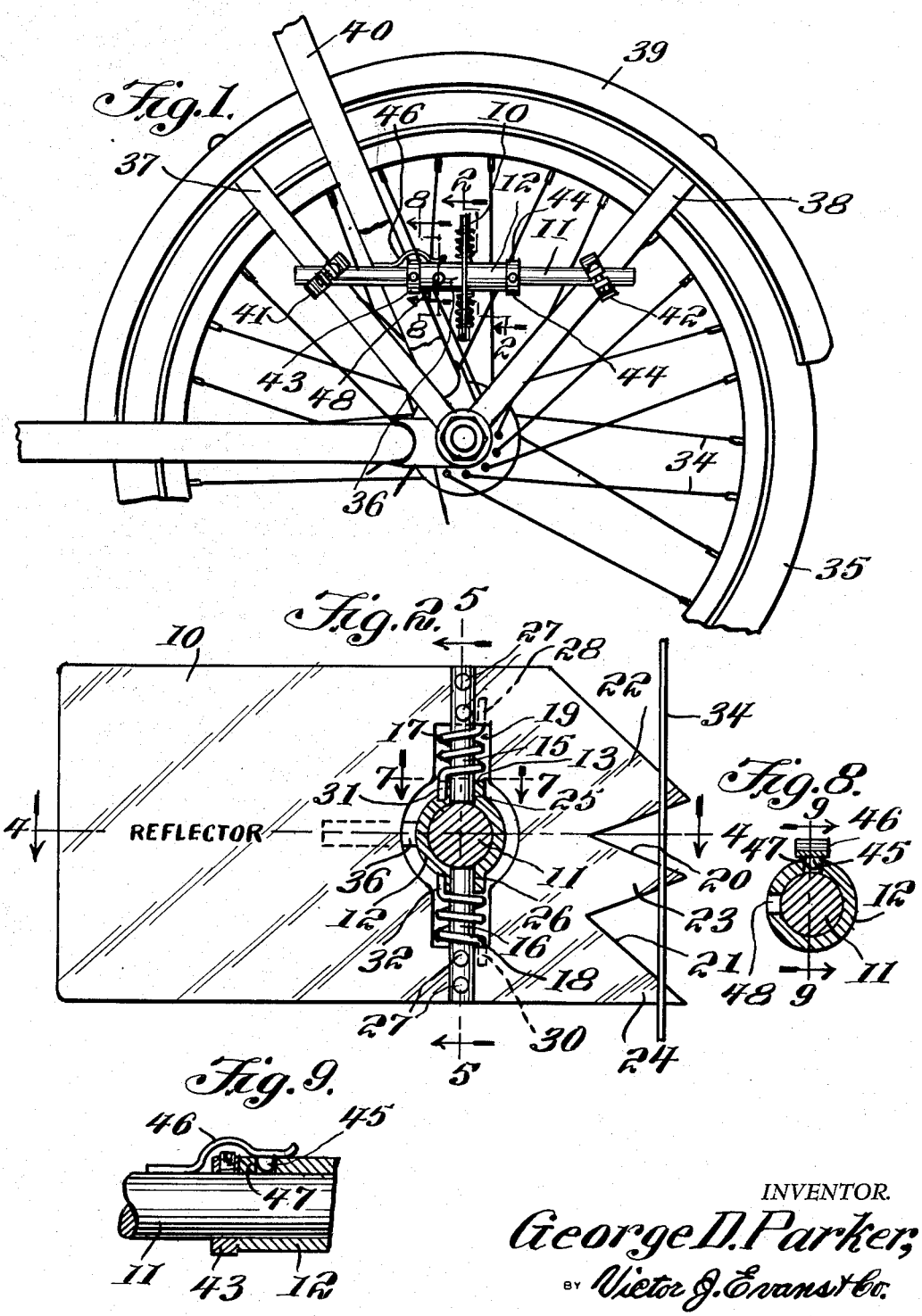
INVENTOR.
George D. Parker,
BY Victor J. Evans & Co.
ATTORNEYS

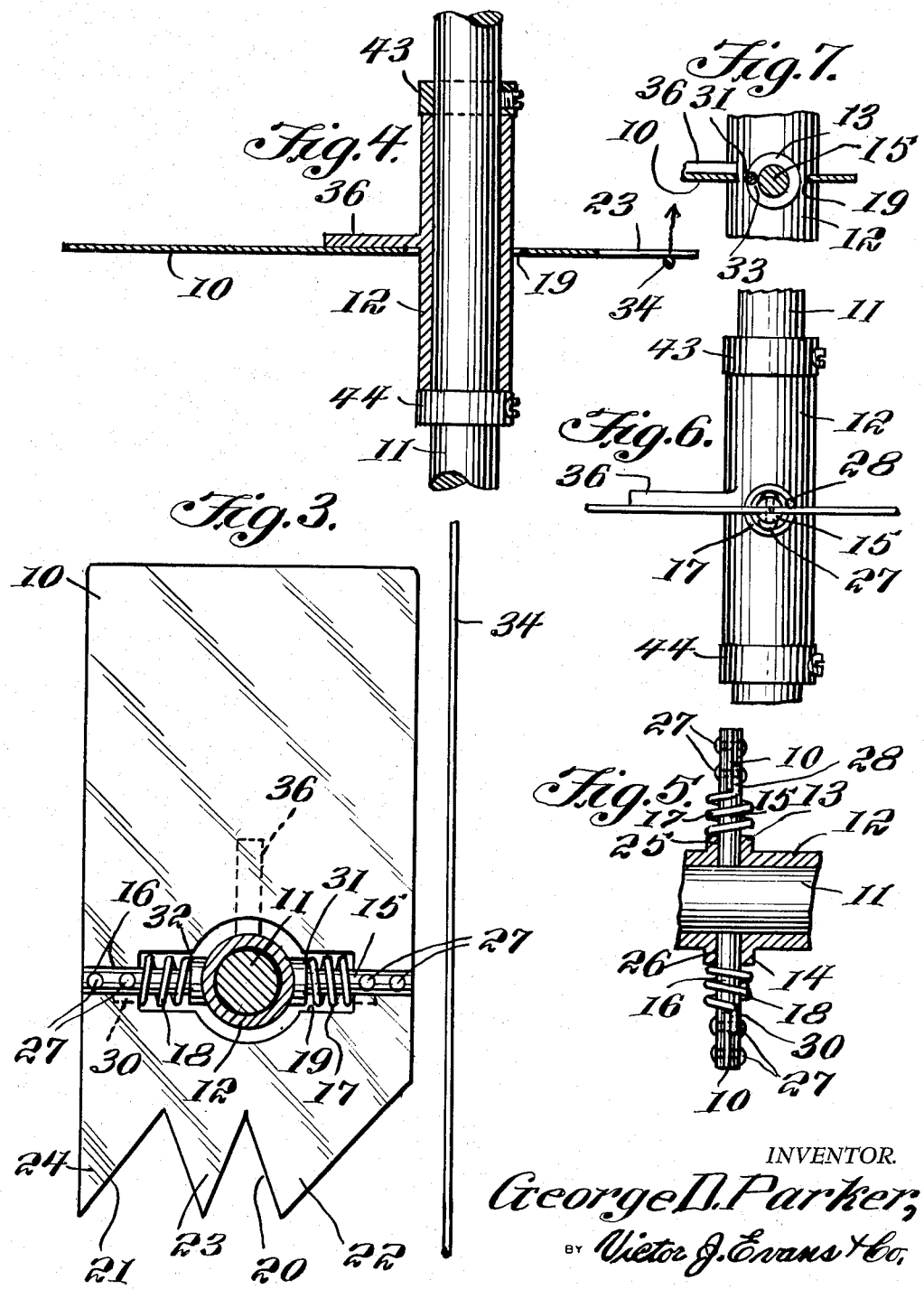

United States Patent Office 2,741,948
Patented Apr. 17, 1956

2,741,948

BICYCLE FLASHING REFLECTOR

George D. Parker, Norristown, Pa.

Application May 21, 1952, Serial No. 289,095

3 Claims. (Cl. 88—81)

This invention relates to safety devices attached to bicycles for attracting the attention of an approaching motor vehicle, and in particular a reflector pivotally mounted on a rod clamped to mud guard braces of a bicycle with resilient means for retaining the reflector in an extended position whereby with one end of the reflector positioned in the path of the spokes of the wheel of the bicycle the reflector will provide a flickering or flashing action.

The purpose of this invention is to provide a safety reflector for bicycles wherein with a projection of the reflector engaging the spokes of a wheel of a bicycle a flashing light is reflected from the headlights of an approaching motor vehicle to attract attention of the operator of the vehicle.

Various types of reflectors have been used on mud guards and other parts of bicycles, however, a comparatively small stationary light reflected from a moving vehicle such as a bicycle is difficult to see, particularly on a dark rainy night. With this thought in mind this invention contemplates a flat panel pivotally mounted on a bicycle frame and adapted to be positioned, selectively whereby it remains stationary in the frame or whereby it may be extended with one end in the path of the spokes of a wheel of the bicycle so that when the opposite end is contacted by light of an approaching vehicle a flashing signal is produced.

The object of this invention is, therefore, to provide a safety flasher for bicycles that is actuated by spokes of a wheel of the vehicle.

Another object of the invention is to provide a safety flasher for a bicycle in which the device may be mounted on a bicycle now in use without changing parts of the bicycle.

A further object of the invention is to provide a safety flasher for a bicycle in which the flasher is of a simple and economical construction.

With these and other objects and advantages in view the invention embodies a rod having clamps on the ends for clamping the rod to braces of a mud guard of a bicycle rear wheel, a hub having aligned oppositely positioned sockets thereon mounted on the rod, a plate having a reflecting surface on one side and having points extended from one end pivotally mounted by pins in bosses of the hub and having springs on the pins for urging the plate in an outwardly extended position.

Other features and advantages of the invention will appear from the following description taken in connection with the drawings, wherein:

Figure 1 is a side elevational view showing the upper portion of a rear wheel of a bicycle with the safety reflector mounted thereon and with parts broken away.

Figure 2 is a side elevational view of the reflector showing the reflector mounted on a rod and with the mounting parts shown in section, said section being taken on line 2—2 of Fig. 1.

Figure 3 is a view similar to that shown in Fig. 2 showing the reflector in a vertically disposed position.

Figure 4 is a sectional plan through the reflector taken on line 4—4 of Fig. 2.

Figure 5 is a detail showing a section through the reflector mounting, said section being taken on line 5—5 of Fig. 2.

Figure 6 is a plan view showing the hub with which the reflector is mounted on the rod.

Figure 7 is a sectional plan taken on line 7—7 of Fig. 2 showing one of the bosses of the reflector mounting hub.

Figure 8 is a cross section taken on line 8—8 of Fig. 1 showing a spring actuated ball for retaining the reflector in an outwardly extended position.

Figure 9 is a longitudinal section taken on line 9—9 of Fig. 8 also showing the spring actuated ball for frictionally retaining the reflector in an outwardly extended or vertically disposed position.

Referring now to the drawings wherein like reference characters denote corresponding parts the improved safety bicycle reflector of this invention includes a baffle or plate 10, a rod 11 by which the baffle is mounted on a bicycle, a hub 12 having bosses 13 and 14 extended from opposite sides in which pins 15 and 16, respectively of the reflector 10 are pivotally mounted, and springs 17 and 18 extended around the pins for returning the reflector to an outwardly extended position.

In the design shown, the reflector 10 is provided with an opening 19 which is formed with an enlarged central section 20 that extends around the hub 12 and one end of the reflector is provided with notches 20 and 21 which form teeth 22, 23, and 24 on the inner or short end thereof.

The bosses 13 and 14 of the hub 12 are provided with bores 25 and 26 into which the ends of the pins 15 and 16 extend, as shown in Fig. 2 and, also as shown in Fig. 2, the outer ends of the pins are secured to the surface of the baffle with rivets or other fasteners as indicated by the numeral 27.

The pins 15 and 16 extend through extended sections of the opening 19 in the reflector 10 and the springs 17 and 18, which are also positioned in the end sections of the opening 19 are positioned whereby extended ends 28 and 30 overlap one side of the reflector with the opposite ends 31 and 32, respectively extended into openings, as indicated by the numeral 33, in the bosses 13 and 14.

With the reflector formed as illustrated in Figs. 1 and 2 and mounted in a horizontal position, spokes, as indicated by the numeral 34 of a bicycle wheel 35, engage the points of the reflector, causing the reflector to swing about the pins 15 and 16 and as the spokes pass over the points the springs 17 and 18 snap the reflector back to a position in a plane perpendicular to a plane through the spokes or base of a wheel in which the spokes are positioned. The springs 17 and 18 urge the reflector 10 against an extended arm 36, as shown in Fig. 4 thereby providing a stop.

The rod 11 is secured to braces 37 and 38 of a mud guard 39 of a bicycle 40 with clamps 41 and 42 and the hub 12 is retained in position on the rod 11 with set collars 43 and 44.

The reflector with the hub 12 is retained in horizontal, or vertical positions, by a ball 45 carried by a spring 46 which is mounted on the rod 11 and, as illustrated in Figs. 8 and 9 the ball 45 is positioned to selectively, snap into openings 47 and 48 in the hub 12 to retain the reflector in an outwardly extended horizontal position, as shown in Fig. 2, or in a vertical position, as shown in Fig. 3.

With the reflector turned to a vertical position, as shown in Fig. 3 the points are spaced from the spokes of a wheel and the reflector remains stationary, however, with the reflector turned to an angle of 90 degrees to the position shown in Fig. 2 the lights of an approaching vehicle strike the surface of the reflector providing a reflected signal and with the points on the opposite end of the reflector engaging the spokes of a bicycle wheel upon which the device is mounted the reflector will snap backwardly and forwardly producing a flashing light.

The spokes of the wheel passing over the points on the short or inner end of the reflector also provide a vibrating sound that coacts with the flashing reflector to attract the attention of the operator of the approaching vehicle.

Although it is preferred to form the device with a red coating it will be understood that the reflector is adapted to be provided in different colors or with any combination of colors thereon.

It will be understood that modifications, within the scope of the appended claims, may be made in the design and arrangement of the parts without departing from the spirit of the invention.

What is claimed is:

1. In a bicycle safety reflector, the combination which comprises a rod having clamps on the ends for clamping the rod to braces of a mud guard of a bicycle, a hub journaled on the rod and having bosses with bores therein extended from opposite sides thereof, a reflector having aligned pins thereon with the pins positioned to extend into the bores of the bosses of the hub, and springs on the pins for retaining the plate in an outwardly extended position wherein points on one end of the plate are in the path of spokes of a wheel of the bicycle.

2. In a bicycle safety reflector, the combination which comprises a rod having clamps on the ends for clamping the rod to braces of a mud guard of a bicycle, a hub journaled on the rod and having bosses with bores therein extended from opposite sides thereof, a reflector having aligned pins thereon with the pins positioned to extend into the bores of the bosses of the hub, and springs on the pins for retaining the plate in an outwardly extended position wherein points on one end of the plate are in the path of spokes of a wheel of the bicycle, and a spring actuated ball positioned to retain the plate, selectively, in an outwardly extended position and also in a vertically disposed position.

3. In a bicycle flashing reflector, the combination which comprises a shaft adapted to be positioned at one side of a rear wheel of a bicycle, means for mounting the shaft on braces of the mud guard of the rear wheel of the bicycle, a plate having an opening therethrough through which the shaft extends, vertically positioned pins attached to the plate, a hub rotatably mounted on said shaft and having bosses with aligned sockets therein extended from opposite sides, said sockets being positioned to receive inner ends of said pins and said hub being adapted to support the plate, selectively, in a horizontal position with one end in the path of spokes of said rear wheel whereby the plate is actuated by the wheel, or with the plate in a vertical position wherein the plate is spaced from the spokes of the wheel, and resilient means for returning the plate to a position of rest.

References Cited in the file of this patent

UNITED STATES PATENTS

| 648,303 | Roberts | Apr. 24, 1900 |
| 1,223,250 | Bowen | Apr. 17, 1917 |
| 1,353,128 | Nakasora | Sept. 14, 1920 |
| 1,952,804 | Hitshew | Mar. 27, 1934 |
| 2,633,097 | Frew | Mar. 31, 1953 |

FOREIGN PATENTS

| 19,670 | Great Britain | of 1908 |
| 26,697 | Great Britain | of 1910 |
| 160,342 | Austria | Apr. 25, 1941 |
| 216,289 | Switzerland | Nov. 17, 1941 |